(12) United States Patent
Elmasry

(10) Patent No.: US 11,540,123 B2
(45) Date of Patent: Dec. 27, 2022

(54) COMPOUND TRANSMISSION SECURITY (TRANSEC) FOR MILITARY-GRADE FIFTH GENERATION (5G) RADIO SYSTEMS

(71) Applicant: Rockwell Collins, Inc., Cedar Rapids, IA (US)

(72) Inventor: George F. Elmasry, San Marcos, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 84 days.

(21) Appl. No.: 17/221,001

(22) Filed: Apr. 2, 2021

(65) Prior Publication Data

US 2021/0329449 A1 Oct. 21, 2021

Related U.S. Application Data

(60) Provisional application No. 63/011,911, filed on Apr. 17, 2020.

(51) Int. Cl.
*H04M 1/66* (2006.01)
*H04M 1/68* (2006.01)
(Continued)

(52) U.S. Cl.
CPC .......... *H04W 12/037* (2021.01); *H04B 1/713* (2013.01); *H04B 7/0413* (2013.01); *H04W 12/041* (2021.01); *H04W 72/04* (2013.01)

(58) Field of Classification Search
CPC . H04W 12/037; H04W 12/041; H04W 72/04; H04B 1/713; H04B 7/0413;
(Continued)

(56) References Cited

U.S. PATENT DOCUMENTS 8,358,613 B1 * 1/2013 Giallorenzi ........... H04W 12/02
370/328
9,980,317 B2 5/2018 Martin
(Continued)

FOREIGN PATENT DOCUMENTS

WO 2018207612 A1 11/2018

OTHER PUBLICATIONS

Ludong Wang, Brain Jezek, OFDM Modulation Schemes for Military Satellite Communications, 2008 IEEE (Year: 2008).*

*Primary Examiner* — Tanmay K Shah
(74) *Attorney, Agent, or Firm* — Suiter Swantz pc llo

(57) ABSTRACT

A multi-user (MU) multiple-input/multiple-output (MU MIMO) module for a fifth-generation (5G) software-defined radio (SDR) network environment is disclosed. In embodiments, the MU MIMO module of a transmitting SDR system of a 5G mobile ad hoc network (MANET) or other peer-to-peer directional network receives feedback from a receiving SDR system based on a prior or current frame and generates, based on the feedback, a compound transmission security (TRANSEC) encryption key for a subsequent frame. The compound TRANSEC encryption key encrypts the transmission of the subsequent frame through a combination of frequency-hopping encryption codes, orthogonality-hopping encryption codes, and dynamic pseudorandom distribution of transmitting power among antenna elements to simulate multipath hopping. The SDR system may include an antenna controller capable of managing dynamic power distribution according to the compound TRANSEC encryption keys as well as directionality shifts and beamforming operations to evade jammers detected within the 5G network environment.

14 Claims, 7 Drawing Sheets

(51) Int. Cl.
  *H04M 3/16* (2006.01)
  *H04W 12/037* (2021.01)
  *H04B 7/0413* (2017.01)
  *H04W 12/041* (2021.01)
  *H04B 1/713* (2011.01)
  *H04W 72/04* (2009.01)

(58) Field of Classification Search
  CPC .. H04B 7/0452; H04B 7/063; H04K 2203/34; H04K 2203/36; H04K 3/42; H04K 3/45; H04K 2203/32; H04K 1/003; H04K 3/226; H04K 3/25; H04K 3/827; Y04S 40/20
  USPC ......................................................... 455/411
  See application file for complete search history.

(56) References Cited

U.S. PATENT DOCUMENTS

| | | | |
|---|---|---|---|
| 2015/0131523 A1* | 5/2015 | Balter | H04B 1/715 370/317 |
| 2020/0036487 A1 | 1/2020 | Hammond et al. | |
| 2020/0107216 A1* | 4/2020 | Greel | H04W 28/0263 |

\* cited by examiner

COMPOUND TRANSMISSION SECURITY (TRANSEC) FOR MILITARY-GRADE FIFTH GENERATION (5G) RADIO SYSTEMS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/011,911 entitled COMPOUND TRANSMISSION SECURITY (TRANSEC) FOR MILITARY-GRADE FIFTH GENERATION (5G) RADIO SYSTEMS, filed Apr. 17, 2020;
Said U.S. Provisional Patent Application 63/011,911 is herein incorporated by reference in its entirety.

TECHNICAL FIELD

The subject matter disclosed herein is directed generally to fifth-generation (5G) cellular communications systems and more particularly to transmission security (TRANSEC) enhancements for military-grade radio platforms compatible with 5G waveforms.

BACKGROUND

Many commercial interests are currently attempting to leverage fifth generation (5G) cellular communications assets, including the associated bandwidth as well as new hardware and software for building private systems and networks. Military communications platforms may similarly be well suited for the high-speed high-capacity capabilities of 5G architectures, but military architectures and software-defined radio (SDR) waveforms and architectures are not intuitively compatible with the 5G spectrum. For example, while it may be possible to retrofit existing military SDR platforms to 5G protocols, 5G does not by itself provide sufficient over-the-air transmission security (TRANSEC) to ensure acceptably low probability of interception and low probability of detection (LPI/LPD).

SUMMARY

A multi-user (MU) multiple-input multiple-output (MIMO) (MU MIMO) module installable in a fifth-generation (5G) communications platform of a mobile ad hoc network (MANET) or other like peer-to-peer directional network environment is disclosed. In embodiments, the MU MIMO module includes control processors in communication with directional MIMO antenna elements of a transmitter-side (Tx) 5G software defined radio (SDR) system or like communications platform. The MU MIMO module receives from a like MU MIMO module of the receiver-side (Rx) SDR system receiver feedback based on the transmission of a current frame from the Tx SDR system to the Rx SDR system, the transmission including a compound transmission security (TRANSEC) key for decrypting/decoding the current frame. Based on the receiver feedback for the current frame, the MU MIMO module generates a compound TRANSEC key for the next frame to be transmitted, the compound TRANSEC key encrypting/encoding the subsequent frame via a combination of frequency hopping, orthogonality hopping, simulated multipath hopping (e.g., pseudorandom distribution of transmission power among the MIMO antenna elements) and beamforming operations to evade detected or potential jammers. The Tx SDR system includes an antenna controller for handing dynamic power distribution among the MIMO antenna elements according to the compound TRANSEC key for the subsequently transmitted frame.

In some embodiments, the receiver feedback is responsive to channel conditions measurements performed based on the training symbols transmitted within the current frame.

In some embodiments, the compound TRANSEC key is configured to prevent a null power distribution to any MIMO antenna element.

In some embodiments, the receiver feedback is indicative of a least faded path and/or an optimally performing antenna element.

In some embodiments, the compound TRANSEC key is generated based on a detected presence (or a detected location) of a jammer.

In some embodiments, the compound TRANSEC key evades the jammer by adjusting a directionality of a MIMO antenna element and/or a beam emitted thereby.

In some embodiments, the receiver feedback is forwarded to a network arbitrator which may be in communication with multiple transmitter-receiver pairs of the network. The network arbitrator may determine a presence and/or location of the jammer (and forward the determined presence/location to the appropriate platform) based on multiple sets of receiver feedback from multiple Tx/Rx pairs.

In some embodiments, the network arbitrator may be a centralized spectrum arbitrator or a platform within one of the Tx/Rx pairs (each of the Tx and Rx platforms serving as a network node) within the network.

A method for enhancing transmission security (TRANSEC) within a fifth-generation (5G) mobile ad hoc network (MANET) or other like peer-to-peer directional network environment is also disclosed. In embodiments, the method includes transmitting, via multiple-input multiple-output (MIMO) antenna elements of a transmitting (Tx) 5G software defined radio (SDR) system, a current frame to a receiving (Rx) 5G SDR system according to at least one current compound TRANSEC encryption key. The method includes receiving, from the Rx 5G radio system, receiver feedback corresponding to the transmission of the current (e.g., most recently transmitted) frame. The method includes generating, via a multi-user MIMO (MU MIMO) module of the Tx 5G SDR system, a subsequent compound TRANSEC encryption key for encoding the transmission of the next frame based on a combination of simulated multipath hopping via 1) dynamic transmission power distribution among the MIMO antenna elements, 2) frequency hopping codes, 3) orthogonality hopping codes, and 4) beamforming operations to evade jammers, all based on the receiver feedback. The method includes adjusting, via an antenna controller of the Tx 5G SDR system, the dynamic distribution of transmitting power among the MIMO antenna elements based on the generated subsequent compound TRANSEC encryption key.

In some embodiments, the method includes 1) transmitting training symbols within a current frame sent to the remote Rx 5G radio system and 2) receiving receiver feedback responsive to channel conditions measurements performed based on the training symbols from the remote system.

In some embodiments, the method includes receiving, via the receiver feedback, an identification of optimally performing transmitting MIMO antenna elements or least faded paths between transmitting MIMO antenna elements and receiving MIMO antenna elements of the remote system.

In some embodiments, the method includes forwarding receiver feedback to an arbitrator of the network environment. The method may include receiving from the arbitrator an indication of a jammer, based on the forwarded receiver feedback (and receiver feedback forwarded to the arbitrator from other Tx/Rx pairs throughout the network).

In some embodiments, the method includes adjusting a directionality of a transmitting MIMO antenna element, and/or adjusting a beam transmitted thereby, based on the indication of a jammer.

In some embodiments, the method includes adjusting the dynamic distribution of transmitting power to prevent null power distribution to any one transmitting MIMO antenna element.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
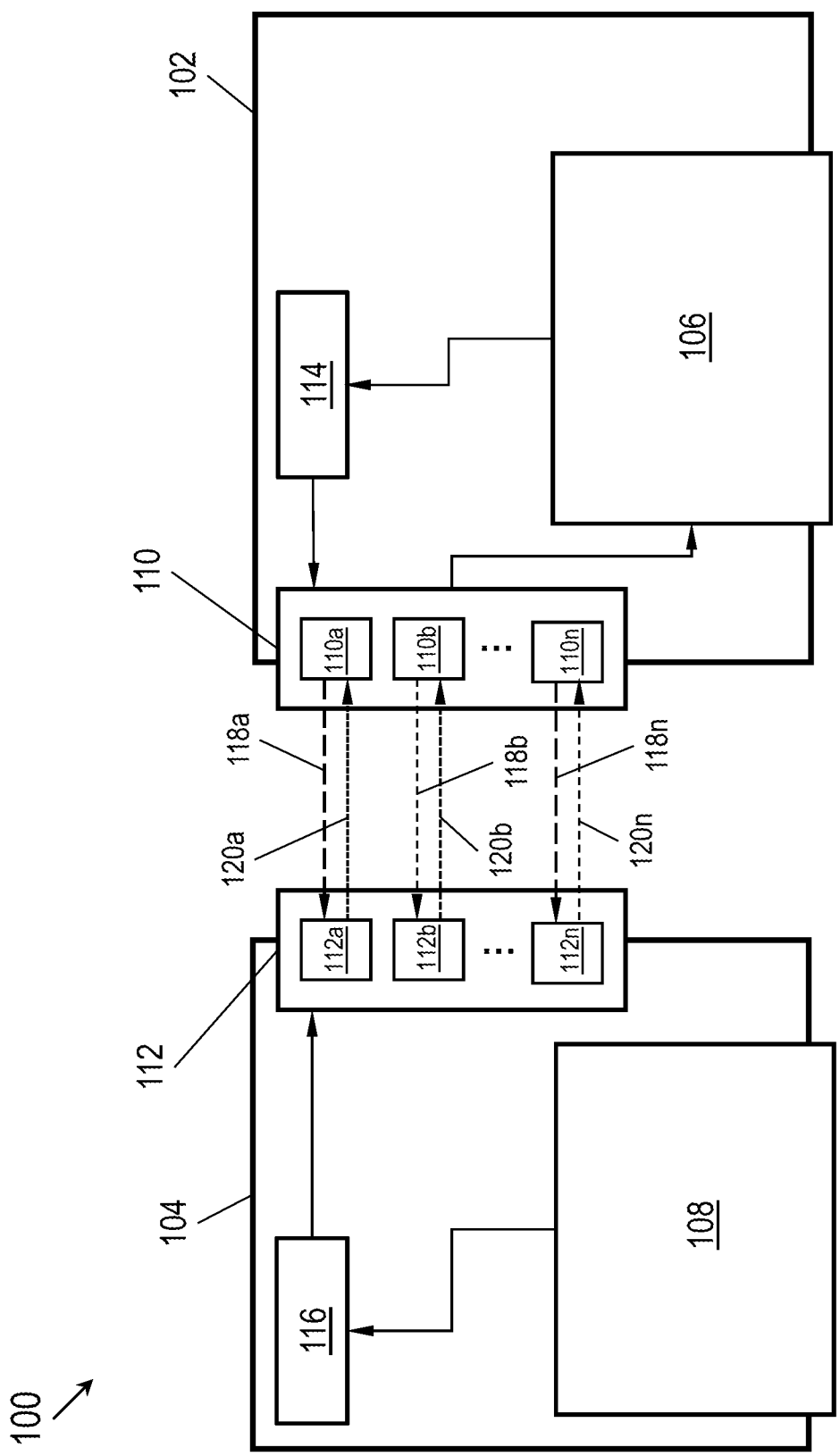
FIG. 1 is a block diagram illustrating a fifth generation (5G) peer-to-peer network environment according to with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a fifth generation (5G) peer-to-peer network 100 for secure military communications is disclosed. The network 100 may include software-defined radio (SDR) systems 102, 104 and multiuser (MU) multiple-input/multiple-output (MIMO) modules 106, 108. In embodiments, the peer-to-peer network 100 may be, but is not limited to, a mobile ad hoc network (MANET) or like network environment.

In embodiments, the SDR systems 102, 104 of the peer-to-peer network 100, as well as all other nodes within the network, are peer nodes. For example, the SDR systems 102, 104 may each include antenna arrays 110, 112 of individual MIMO antenna elements 110a-n, 112a-n and antenna controllers 114, 116. In embodiments, the antenna controllers 114, 116 may control the establishment and maintenance of directional RF paths 118a-n (e.g., whereby the SDR system 102 may securely transmit to the SDR system 104) and 120a-n (e.g., whereby the SDR system 104 may similarly securely transmit to the SDR system 102).

In embodiments, the MU MIMO modules 106, 108 may be built into the SDR systems 102, 104, or the MU MIMO modules may be retrofitted into existing military SDR systems in order to render the existing military SDR systems compatible with 5G waveforms and protocols. For example, the MU MIMO modules 106, 108 may serve as 5G modems for their respective SDR systems 102, 104, adapting and porting 5G protocols and their associated open-source software to general purpose processes (GPP) running on the internal processors of the SDR systems. The MU MIMO modules 106, 108 may provide enhanced transmission security (TRANSEC) at the air-interface level to enable 5G transmissions to meet the requirements of military communications without otherwise modifying the platform hardware of the SDR systems 102, 104.

Figure 2:
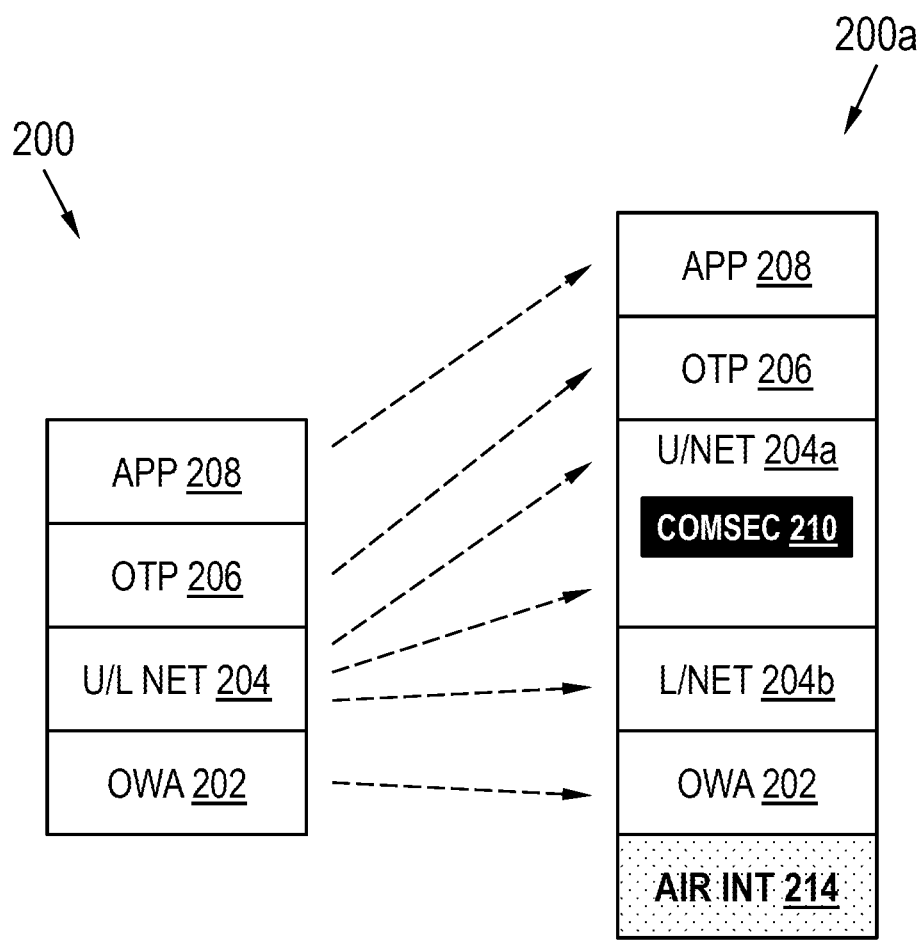
FIG. 2 is a block diagram illustrating a 5G protocol stack associated with the peer-to-peer network environment of FIG. 1.

Referring to FIG. 2, the 5G protocol stacks 200 and 200a are shown.

In embodiments, the 5G protocol stack 200 is a commercial-grade stack incorporating open wireless architecture (OWA) layer 202, upper and lower network layers 204a-b, open transport protocol (OTP) or transport layer 206, and application layer 208.

In embodiments, the 5G protocol stack 200a may be implemented and may function similarly to the 5G protocol stack 200, except that the 5G protocol stack 200a may be adapted for military secure communications via multilayered security enhancements. For example, the OTP layer 206 may incorporate heightened secure transport protocols (e.g., NACK oriented reliable multicast (NORM)) and other bespoke transport protocols with enhanced security capabilities. The upper and lower network layers 204a-b may be enhanced by, e.g., strengthening packet recovery via network coding to recover data packets lost to type I decryption at the upper network layer 204a. Similarly, error resilience may be increased by taking advantage of abundant 5G bandwidth via SDR techniques (e.g., Reed-Solomon coding to reconstruct IP packets from their OWA frames, even when the frame loss rate is relatively high) at the lower network layer 204b. Finally, military-grade type I communication security (COMSEC) encryption architecture 210 (e.g., high assurance internet protocol encryption (HAIPE), other IP-based type I encryption) may be added between the upper and lower network layers 204a-b.

In embodiments, the 5G protocol stack 200a may incorporate MU MIMO modules (106, 108; FIG. 1) and MIMO antenna elements (110a-n, 112a-n; FIG. 1) at the air-interface layer 214 (e.g., sharing physical and data-link layer properties with the OWA layer 202). For example, the new air-interface layer 214 may utilize the MU MIMO modules 106, 108 to augment, e.g., the multipath hopping, dynamic transmission power distribution, beamforming, and low probability of interception/low probability of detection (LPI/LPD) capabilities of the MIMO antenna elements 110a-n, 112a-n, providing enhanced TRANSEC allowing the adaptation of the 5G network stack 200 into military communications as a true MANET waveform.

Figure 3A:
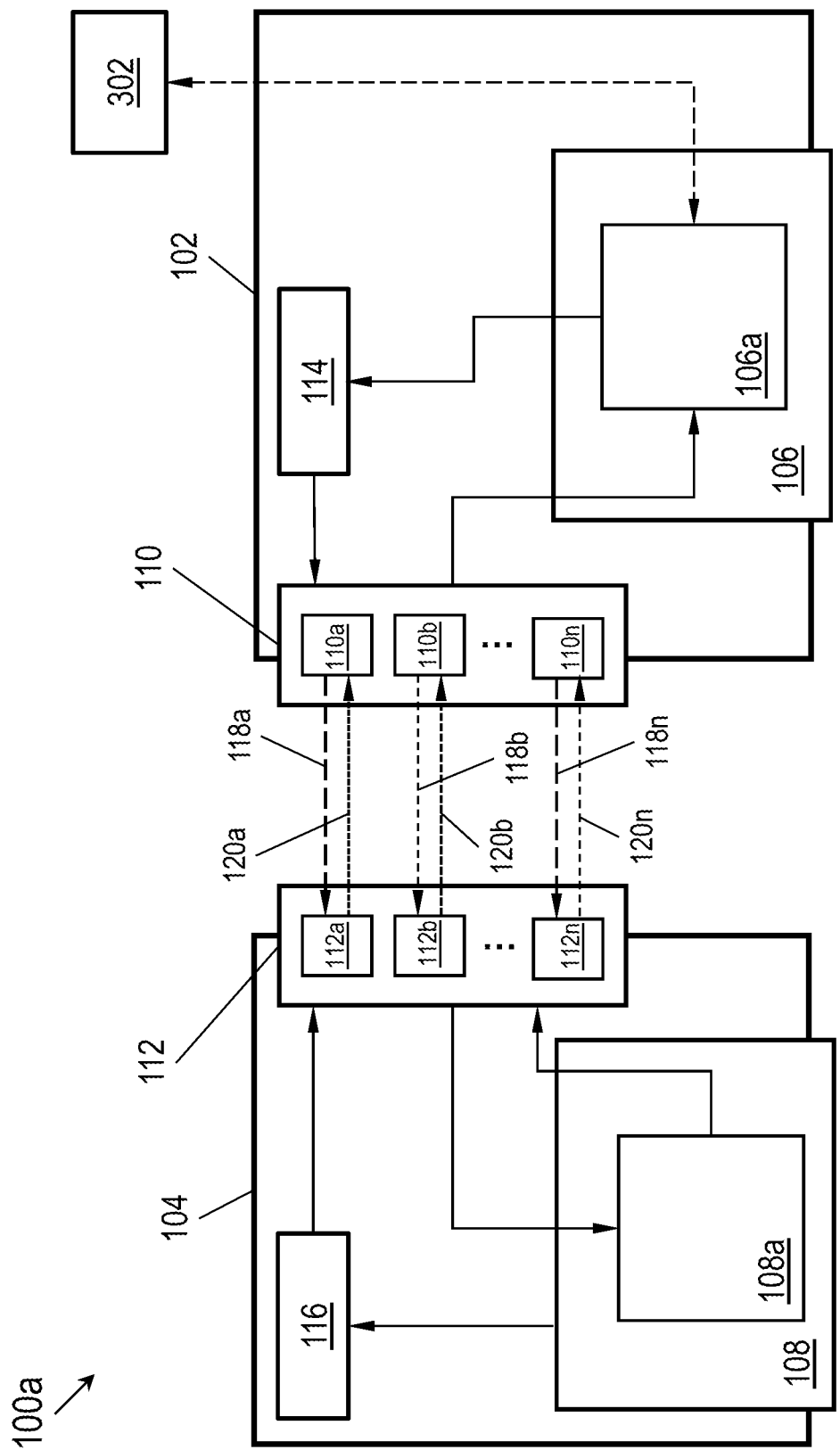
FIGS. 3A and 3B are diagrammatic illustrations of transmission security (TRANSEC) operations of multi-user (MU) multiple-input/multiple-output (MIMO) modules of the peer-to-peer network environment of FIG. 1.
Figure 3B:
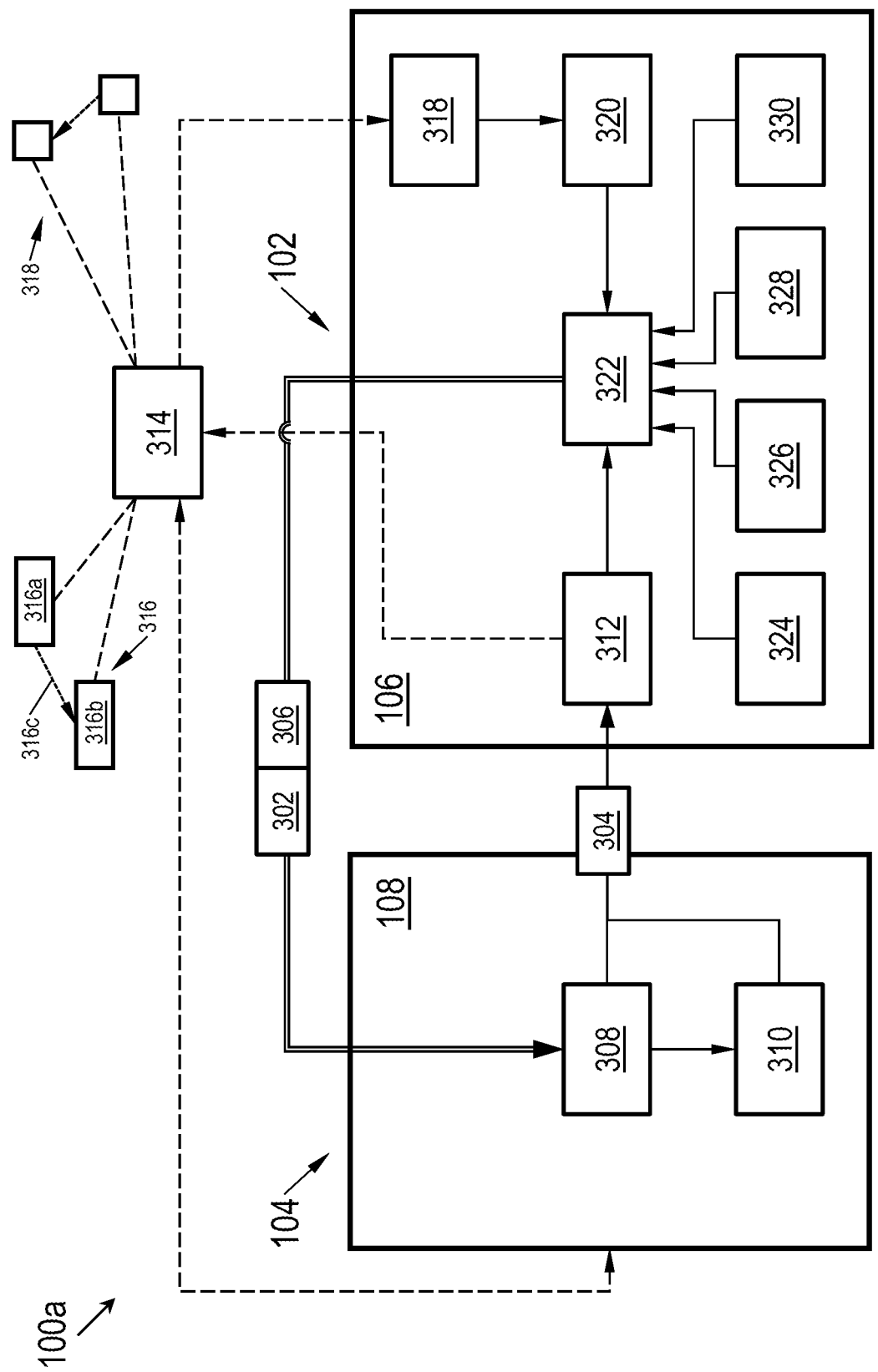

Referring to FIGS. 3A and 3B, the peer-to-peer network 100a may be implemented and may function similarly to the peer-to-peer network 100 of FIG. 1, except that the MU MIMO modules 106, 108 and MIMO antenna elements 110a-n, 112a-n of the peer-to-peer network 100a may optimize MIMO channel mutual information to provide dynamic compound TRANSEC keys for the encryption of transmissions from the transmitting (Tx) SDR system 102 to the receiving (Rx) SDR system 104.

In embodiments, referring in particular to FIG. 3A, the SDR systems 102, 104 are each peer nodes of the peer-to-peer network 100a, the MU MIMO module 106 of the SDR system 102 encrypting transmission frames and controlling the distribution of transmission power to the MIMO antenna elements 110a-n to minimize the MIMO channel signal RF footprint, and enhance LPD/LPI capabilities of, secure 5G transmissions to the SDR system 104 via the directional RF paths 118a-n. (The MU MIMO module 108 of the SDR system 104 may similarly encrypt and control transmissions to the SDR system 102 via the MIMO antenna elements 112a-n and directional RF paths 120a-n.) For example, single-input/single-output (SISO) channels may utilize time- and frequency-domain hopping, changing a hopping pattern in a pseudorandom fashion to evade signal jammers. Broadly speaking, multi-path MIMO signals (e.g., employing directional RF paths 118a-n) may be more difficult for directional jammers to track than SISO signals; accordingly the SDR systems 102, 104 may incorporate a larger number of MIMO antenna elements 110a-n, 112a-n and thus a larger number of directional RF paths 118a-n, 120a-n.

In embodiments, the MU MIMO module 106 may (e.g., via control processors 106a) generate compound TRANSEC encryption keys based on the orthogonal nature of 5G signals. For example, the directional RF paths 118a-n may each be associated with specific spectrum resources defined by orthogonal frequency blocks. Accordingly, the MU MIMO module 106 may generate compound TRANSEC encryption keys on a frame-by-frame basis such that the RF directional paths 118a-n appear to hop between different orthogonal dimensions. For example, whether the RF directional paths 118a-n correspond to uplink or downlink transmissions, the selection of spectrum resources by the MU MIMO module 106 may be described as orthogonal/asynchronous, as the selection may be randomized from orthogonal blocks (e.g., as compared to conventional 5G standards which provide for orthogonal/asynchronous downlink but non-orthogonal/asynchronous uplink; within the peer-to-peer network 100a, however, there is no distinction between uplink and downlink).

In embodiments, referring also to FIG. 3B, the MU MIMO module 106 may generate compound TRANSEC encryption keys 302 for frames to be transmitted from the Tx SDR system 102 to the Rx SDR system 104 (e.g., via the MIMO antenna elements (112a-n, FIG. 3A) and directional RF paths (118a-n, FIG. 3A)) based at least partially on feedback 304 received from the Rx SDR system 104 (e.g., via the directional RF paths (120a-n, FIG. 3A)). For example, the MU MIMO module 106 may incorporate into a transmitted frame (e.g., a frame m of a sequence of n encrypted frames 1, 2 . . . m n) training symbols 306 for optimizing MIMO channel information (e.g., along with the TRANSEC encryption key 302 for the frame m). Based on the reception of these training symbols 306 by the MU MIMO module 106 of the Rx SDR system 104, the MU MIMO module 108 may generate (e.g., via control processors (108a, FIG. 3A)) receiver feedback 304, e.g., determinations of which directional RF paths 118a-n (and/or which pair of MIMO antenna elements 110a/112a, 110b/112b, 110n/112n) are associated with the best performance (e.g., least faded path) or are associated with the highest levels of interference. For example, the receiver feedback 304 may be responsive to channel conditions measurements performed by the MU MIMO module 108 based on the received training symbols 306.

In embodiments, the MU MIMO module 108 may generate receiver feedback 304 by calculating eigenvalues (308) corresponding to the reception of the training symbols 306 (e.g., as disclosed in greater detail below with respect to FIGS. 4A-B). Additionally or alternatively, the MU MIMO module 108 may detect (310) interference indicative of the presence of a jammer (312) and/or contribute to the identification of the location of the jammer. For example, the receiving MU MIMO module 108 may associated a given RF directional path 118n with high levels of interference and convey the jammer impact information (312) (e.g., along with calculated eigenvalues 308) via receiver feedback 304 to the MU MIMO module 106. The MU MIMO module 106 may in turn convey jammer impact information 312 to a centralized spectrum arbitrator 314 (e.g., centralized server) in communication with other transmitting/receiving (Tx/Rx) pairs (316, 318) of SDR systems within the network 100a., the centralized spectrum arbitrator 314 may analyze jammer impact information 312 (e.g., path fading and performance information) between some or all transmitting and receiving pairs (316, 318) of the network 100a in light of terrain data to discover unexpected fading patterns persistent between particular pairs of SDR systems 102, 104. For example, unexpected fading patterns may be indicative of a jammer targeting particular locations via the use of directional beams; in some embodiments, the centralized spectrum arbitrator 314 may be able to determine a direction of the jamming and/or a location of the jammer (or of its targeted area). Location information 318 associated with detected or potential jammers may be sent back to the MU MIMO module 106 of the transmitting SDR system 102 to inform beamforming techniques 320 configured to avoid jammers, as disclosed in greater detail below.

In embodiments, receiver feedback 304 generated by the MU MIMO module 108 and corresponding to a transmitted frame m may be conveyed to the MU MIMO module 106 of the transmitting SDR system 102 as instantaneously as possible (e.g., with minimal delay) so that the transmission of the subsequent frame m+1 (e.g., including the subsequent TRANSEC encryption key 302 and training symbols 306) by the MIMO antenna elements 110a-n of the SDR system 102 may be optimized accordingly. It should be noted that receiver feedback 304 corresponding to transmission via a set of directional RF paths 118a-n may not be symmetrical. For example, the MU MIMO modules 106, 108 of the receiving SDR 104 may not assume that a pair of MIMO antenna elements 110a/112a, 110b/112b, 110n/112n associated with a least faded path, or with optimal performance, with respect to a directional RF path 118a-n will also display identical characteristics with respect to the directional RF path 120a-n associated with transmissions from the SDR system 104 to the SDR system 102.

In embodiments, the MU MIMO module 106 may further enhance signal resilience to jammers by generating compound TRANSEC encryption keys 302 configured to dynamically shift the distribution of transmission power (322) among the MIMO antenna elements 110a-n (e.g., via the antenna controller (114, FIG. 3A)). For example, the antenna controller 114 may vary power distribution along the directional RF paths 118a-n based on pseudorandom algorithms; such "multipath hopping" (324) may appear to a jammer as random variations in power distribution among the directional RF paths 118a-n, enhancing the LPD/LPI capabilities of transmitted RF signals and further complicating attempts to precisely jam the signals. By compounding multiple dimensions (e.g., frequency hopping 326, orthogonality hopping 328, multipath hopping 324, dynamic power distribution 330) into a single compound TRANSEC encryption key 302, the resulting transmission of each subsequent frame may appear to any eavesdroppers or potential jammers (e.g., apart from the MU MIMO module 106 of the Rx SDR system 104) as random noise.

Figure 4A:
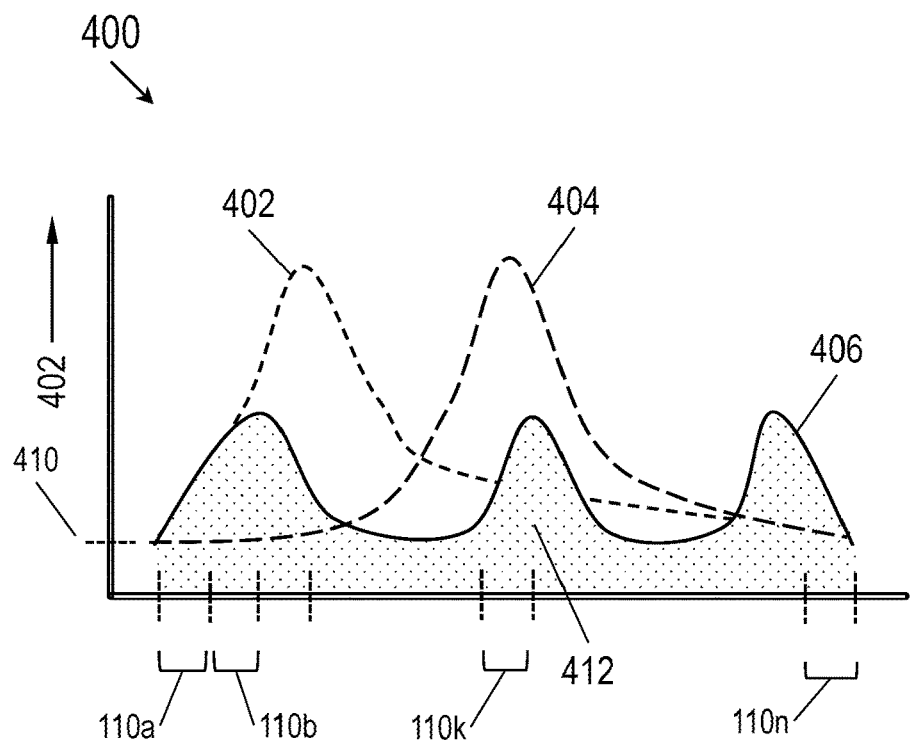
FIGS. 4A and 4B are plots of dynamic power distribution among MIMO antenna elements of the peer-to-peer network environment of FIGS. 1 and 3.
Figure 4B:
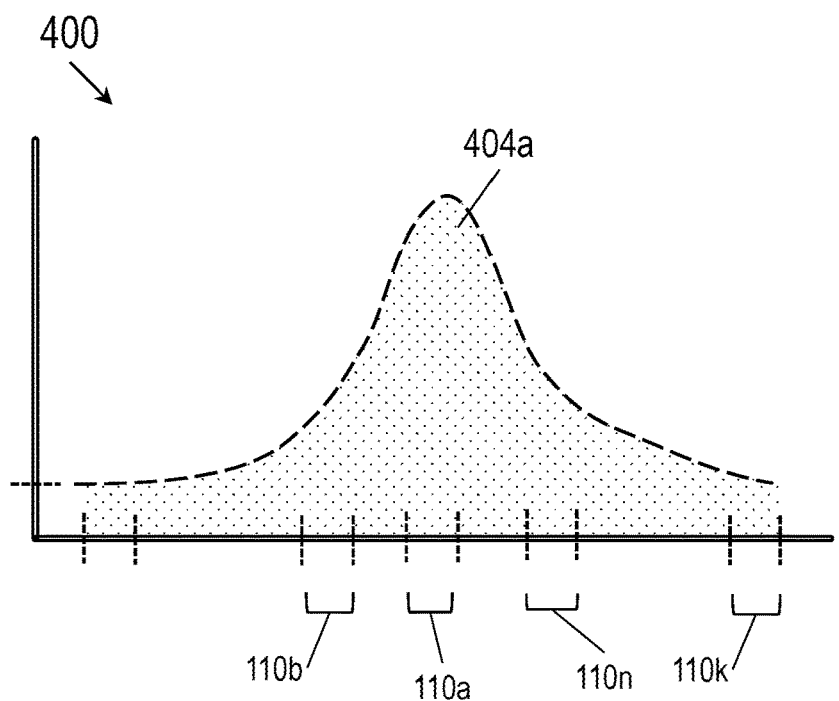

Referring to FIGS. 4A and 4B, the plot 400 illustrates the dynamic distribution (330, FIG. 3B) of transmission power (402) among the N MIMO antenna elements 110a, 110b . . . 110k . . . 110n according to the compound TRANSEC encryption keys (302, FIG. 3B) generated by the transmitting MU MIMO module (106, FIGS. 3A-B). For example, possible distributions of transmitting power may include, but are not limited to, the curves 404, 406, 408.

In embodiments, the compound TRANSEC encryption keys 302 generated by the MU MIMO module 106 may provide for dynamic shifts of transmission power between the MIMO antenna elements 110a-n on a frame-by-frame basis such that transmission power may be distributed unevenly among the N MIMO antenna elements, but there is no null distribution of power to any single MIMO antenna element, e.g., each of the N MIMO antenna elements operates at least at a minimum power level 410. For example, as the transmission power is consistent, the area 412 under the curves 404, 406, 408 is always the same.

In embodiments, referring also to FIG. 4B, the order of the MIMO antenna elements 110a-n is fluid, and may be rearranged frame to frame by the MU MIMO module 106 such that the transmission power distribution among the MIMO antenna elements 110a-n appears random to potential jammers. For example, the power distribution curve 404a for the subsequent frame (m+1) may resemble the curve 404 shown by FIG. 4A (e.g., the power distribution curve for the frame m) except that the order of MIMO antenna elements 110a, 110b, . . . 110k . . . 110n may be rearranged (e.g., were the MIMO antenna elements 110a-n to be plotted in the same order for the subsequent frame (m+1) as with the curve 404, the actual power distribution curve would appear significantly different from the curve 404).

In embodiments, the precise distribution (404, 404a, 406, 408) of transmission power for any given frame may be dependent on one or more factors emphasized by a given compound TRANSEC encryption keys 302 (or, e.g., on receiver feedback (304, FIG. 3B) conveyed by the receiving MU MIMO module (108, FIG. 3B)). For example, if the MU MIMO 106 includes training symbols (306, FIG. 3B) in transmissions from the Tx SDR system (102, FIG. 3A) to the Rx SDR system (104, FIG. 3A) the channel gain matrix H may be known on both the transmitter and receiver sides. The capacity of such a channel (e.g., incorporating the directional RF paths 118a-n, FIG. 3A) may be expressed as $$C = \sum_{i=1}^{n} \log_2\left(1 + \frac{\lambda_i P_i}{\sigma_n^2}\right)$$

where $\lambda$ is the i-th eigenvalue of the matrix HH*, n is the number of transmit/receive antenna pairs (e.g., 110a/112a, . . . 110n/112n, FIG. 3A), and $P_1, P_2, \ldots P_n$ is the normalized power distribution among transmitting MIMO antenna elements 110a-n such that:

$$\Sigma_{i=1}^{n} P_i = 1$$

In embodiments, the eigenvalues $\lambda_1, \lambda_2 \ldots \lambda_n$ may be changed by adjusting the direction of each transmitting MIMO antenna element 110a-n. If, for example, the goal is to maximize the capacity C of the MIMO channel (e.g., directional RF paths 118a-n), each transmitting MIMO antenna element 110a-n (i) may seek an ideal line-of-sight (LOS) beam such that any change in the location of antenna element/s would not change the corresponding eigenvalue $\lambda_i$. In this ideal situation, $\Sigma_i \lambda_i = \Sigma_{ij}|h_{ij}|^2$ and the constraints on the eigenvalues are simply dependent on the channel gain. In order to maximize the channel capacity C, we may find $\lambda_1$, $\lambda_2 \ldots \lambda_n$ and $P_1, P_2 \ldots P_n$ such that $\Sigma_i P_i$ is bounded by the total transmit signal energy $E_s$. If we express $\Sigma_i \lambda_i = L$ for a given signal energy, then we may seek to determine how to distribute the transmit signal energy among the different transmitting MIMO antenna elements 110*a-n* and how to influence directionality so as to create variation in $\lambda_1$, $\lambda_2 \ldots \lambda_n$.

In embodiments, the eigenvalues $\lambda_1, \lambda_2 \ldots \lambda_n$ may be influenced such that $\lambda_1 \geq \lambda_2 \geq \ldots \geq \lambda_n$ without losing any generality; the inequality simply varies the eigenvalues regardless of their order. By way of several non-limiting examples:

(1) When signal/noise ratio (SNR) is low (e.g., power emissions are low, and the Rx SDR system 104 is nearby), $P_i$ may equal the total transmit signal energy $E_s$ and $\lambda_i = L$. All other eigenvalues and transmission power levels (402, 404, 404*a*, 406) may be zero ($\lambda_j = P_j = 0$ for all j>1) and the MIMO antenna elements 110*a-n* may create a focused beam for optimal LPD/LPI.

(2) However, when signal to noise/interference ratio (SNIR) is sufficiently high, the Tx SDR system 102 may be trying to reach a distant remote Rx SDR system 104, necessitating an increase in power to overcome the added distance. For example, according to an optimal solution, $\lambda_1 = \lambda_2 = \lambda_n = L/n$ and $P_1 = P_2 = \ldots = P_n = E_s/n$ for total transmit signal energy $E_s$ and n parallel channels. By distributing signal energy $E_s$ evenly among all n parallel channels, directionality may be controlled and all eigenvalues kept equal, maximizing the channel capacity C.

(3) In some embodiments, an adversary or jammer may affect the eigenvalues $\lambda_1, \lambda_2 \ldots \lambda_n$. For example, the Rx SDR system 104 may indicate the presence of a jammer, e.g., by observing a significant reduction in channel capacity C (jammer impact information 312, FIG. 3B). For example, the presence of a jammer may be detected by the MU MIMO module 108 (e.g., or by the centralized spectrum arbitrator (314, FIG. 3B) based on the jammer impact information 312 and like information from other Tx-Rx pairs (316/318, FIG. 3B)) as $\Sigma_i P_i < E_s$ and $\Sigma_i \lambda_i > L$; the indication of the jammer 312 may be included in receiver feedback 304 conveyed to the MU MIMO module 106 of the Tx SDR system 102 as described above. In the presence of a jammer, maximizing the channel capacity C can be expressed as:

$$\max C = \begin{array}{c} \min \\ \lambda_i : \\ \Sigma_i \lambda_i > L \end{array} \begin{array}{c} \max \\ P_i : \\ \Sigma_i P_i < E_S \end{array} \sum_{i=1}^{n} \log_2 \left(1 + \frac{\lambda_i P_i}{\sigma_n^2}\right)$$

which suggests that the antenna controller (114, FIG. 3A) redistribute transmission power (402, 404, 404*a*, 406) among the transmitting MIMO antenna elements 110*a-n* and adjust directionality to thwart the jammer, such that the receiver-side MU MIMO module 108 conveys back to the transmitter-side MU MIMO module 106 all-nonzero eigenvalues (308, FIG. 3B; e.g., a worst-case scenario, where the receiver-side MU MIMO module 108 cannot determine the impact of the jammer, being associated with all-zero eigenvalues indicative of a null power distribution to one or more MIMO antenna elements 100*a-n*). For example, the antenna controller 114 may be trained via machine learning techniques to control directionality while accounting for changes in terrain and thereby evade the jammer, adjusting the directionality of any transmitting/receiving MIMO antenna element pairs (110*a*/112*a*, 110*b*/112*b*, 110*n*/112*n*) while providing transmission power distribution (402, 404, 404*a*, 406) to channels/transmitting MIMO antenna elements 110*a-n* (if unevenly) and avoiding a null power distribution to any MIMO antenna element.

Figure 5:
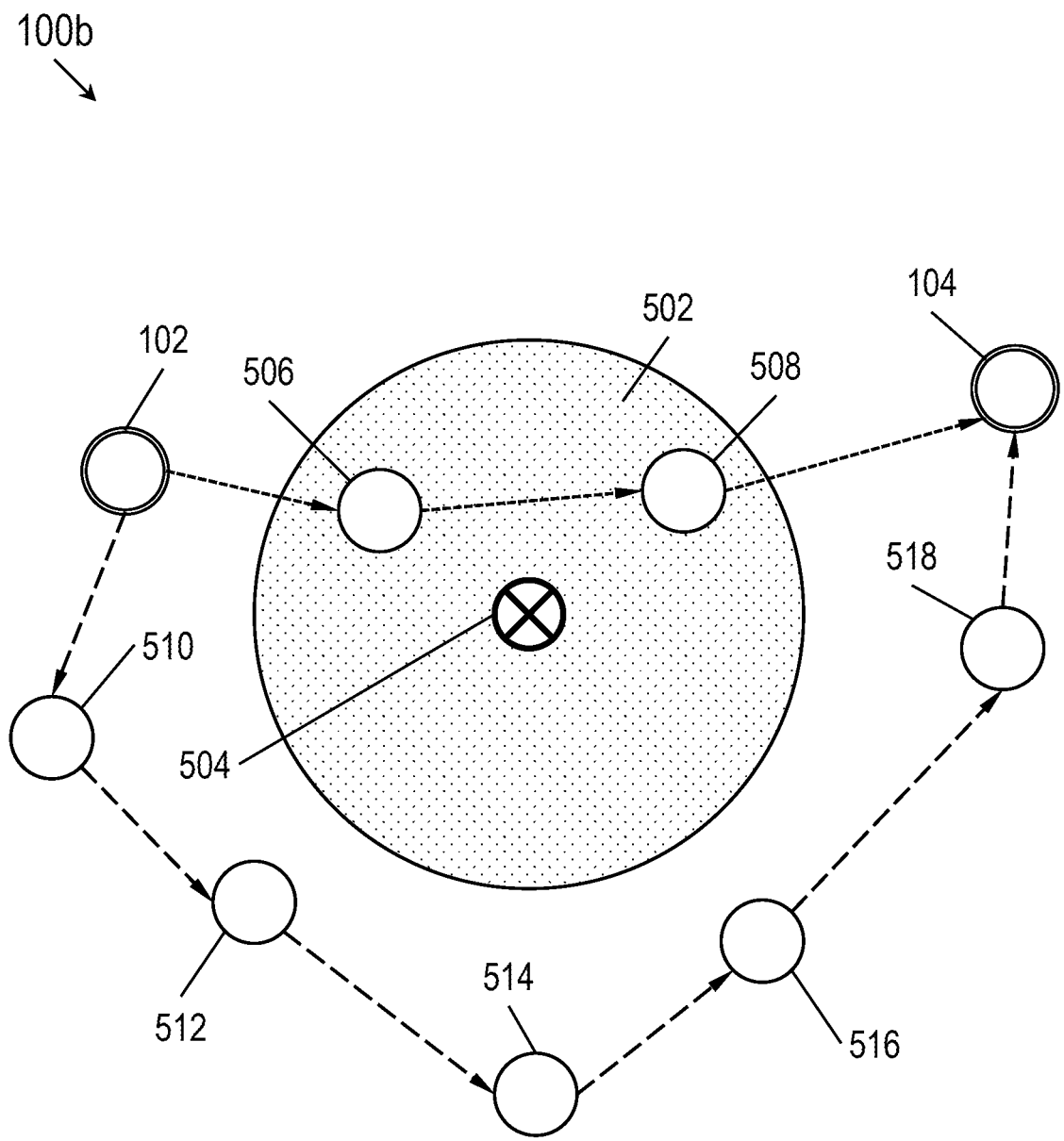
FIG. 5 is a diagrammatic illustration of beamforming operations of the peer-to-peer network environment of FIGS. 1 and 3.

Referring also to FIG. 5, the peer-to-peer network 100*b* may be implemented and may function similarly to the peer-to-peer networks 100, 100*a* of FIGS. 1 and 3, except that the Tx SDR system 102 of the peer-to-peer network 100*b* may incorporate into the compound TRANSEC encryption key (302, FIG. 3B) beamforming techniques (320, FIG. 3B) to avoid an identified compromised area 502.

In embodiments, the compromised area 502 may be identified or detected by the receiving SDR system 104 or by the centralized spectrum arbitrator (314, FIG. 3B) as described above. For example, while jammers 504 and/or eavesdroppers may exist within the compromised area 502, their precise locations may not be known. The shortest path between the Tx SDR system 102 and the Rx SDR system 104 (e.g., incorporating relaying SDR systems 506, 508) may hop through the compromised area 502. The MU MIMO module (106, FIGS. 3A-B) of the Tx SDR system 102 may direct the antenna controller (114, FIG. 3A) to decrease overall power emissions and narrow the beams emitted by the MIMO antenna elements (110*a-n*, FIG. 3A) in order to increase the number of hops (e.g., relaying SDR systems 510, 512, 514, 516, 518) and avoid hopping through the compromised area 502.

Figure 6:
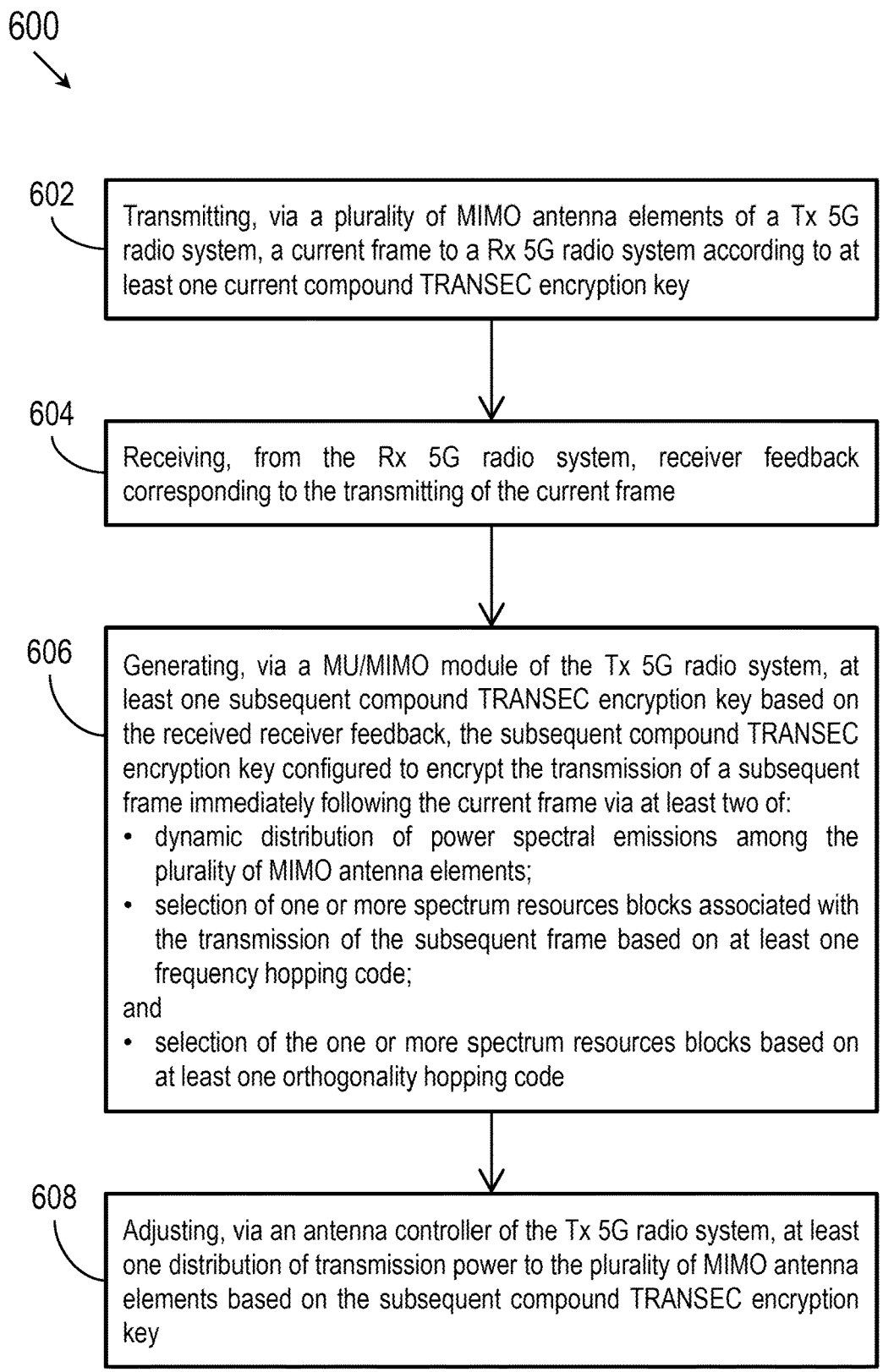
FIG. 6 is a flow diagram illustrating a method for enhancing TRANSEC within a 5G peer-to-peer network environment according to example embodiments of this disclosure.

Referring to FIG. 6, the method 600 may be implemented by the peer-to-peer network environments 100, 100*a-b* and may include the following steps.

At a step 602, a set of MIMO antenna elements of a transmitting (Tx) 5G SDR system of the peer-to-peer network environment transmits a current frame to a receiving (Rx) 5G SDR system according to at least one current compound TRANSEC encryption key generated by a multi-user (MU) multiple-input multiple-output (MIMO) module of the Tx 5G SDR system. In some embodiments, the current frame may include training symbols for evaluating the directional RF path or paths associated with the transmission.

At a step 604, the MU MIMO module of the Rx 5G SDR system conveys feedback about the transmission of the current frame back to the MU MIMO module of the Tx 5G SDR system. In some embodiments, the receiver feedback may be responsive to channel conditions measurements performed based on the transmitted training symbols. In some embodiments, the receiver feedback may include identification of a least faded path among the RF directional paths, or an identification of an optimally performing transmitting-receiving pair of MIMO antenna elements (e.g., associated with a least faded path). In some embodiments, the receiver feedback may include an indication of a jammer or eavesdropper.

At a step 606, the MU MIMO module of the Tx 5G SDR system generates a compound TRANSEC encryption key for the next frame to be transmitted, based on the receiver feedback. The compound TRANSEC encryption key encrypts the transmission of the next frame according to a combination of 1) selection of spectrum resources blocks according to frequency-hopping codes, 2) selection of spectrum resources blocks according to orthogonality-hopping codes, and 3) multipath hopping via dynamic distribution of transmission power among the transmitting MIMO antenna elements. In some embodiments, the MU MIMO module of the Tx 5G SDR system forwards the received receiver feedback to an arbitrator of the peer-to-peer network environment (e.g., a third party node (peer node) or centralized spectrum arbitrator configure to monitor other Tx/Rx pairs throughout the network environment. The MU MIMO module may receive from the arbitrator an indication of the presence of (or, in some embodiments, the direction or location of) a jammer or potential jammer, based on monitoring and analysis of receiver feedback throughout the network environment.

At a step 608, an antenna controller of the Tx 5G SDR system adjusts the distribution of transmitting power to the transmitting MIMO antenna elements according to the generated compound TRANSEC encryption key. In some embodiments, the antenna controller may adjust the directionality, the transmitting power, or otherwise adjust a beam transmitted by the MIMO antenna elements, e.g., to evade a potential jammer. In some embodiments, the antenna controller may adjust power distribution so as to prevent a null power distribution to any single MIMO antenna element.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A multi-user (MU) multiple-input multiple-output (MIMO) module installable in a fifth-generation (5G) communications platform, comprising:
at least one control processor in communication with a plurality of MIMO antenna elements of a transmitting (Tx) 5G communications platform associated with a peer-to-peer network environment, the control processor configured to:
receive, from at least one receiving (Rx) 5G communications platform of the peer-to-peer network environment, receiver feedback corresponding to a current frame of a transmission from the Tx 5G communications platform to the Rx 5G communications platform;
generate, based on the receiver feedback, a compound transmission security (TRANSEC) key corresponding to a subsequent frame of the transmission, the subsequent frame directly following the current frame, the compound TRANSEC key configured to encrypt the subsequent frame via two or more of:
dynamic distribution of transmission power among a plurality of MIMO antenna elements configured for transmission of the subsequent frame;
selection of one or more spectrum resources blocks associated with the transmission of the subsequent frame based on at least one frequency hopping code;
and
selection of the one or more spectrum resources blocks based on at least one orthogonality hopping code;
and
at least one antenna controller configured to adjust the dynamic distribution of transmitting power to the plurality of MIMO antenna elements based on the compound TRANSEC key.

2. The MU MIMO module of claim 1, wherein:
the receiver feedback is based on one or more training symbols transmitted with the current frame.

3. The MU MIMO module of claim 1, wherein the compound TRANSEC key is configured to prevent a null power distribution to at least one antenna element of the plurality of MIMO antenna elements.

4. The MU MIMO module of claim 1, wherein the receiver feedback incudes at least one of:
an identification of a least faded path from at least one antenna element of the plurality of MIMO antenna elements to at least one remote MIMO antenna element of the Rx 5G communications platform;
and
an identification of an optimally performing element of the plurality of MIMO antenna elements.

5. The MU MIMO module of claim 1, wherein the control processor is configured to generate the compound TRANSEC key based on at least one of:
a detected presence of a jammer;
and
a detected location of the jammer.

6. The MU MIMO module of claim 5, wherein the compound TRANSEC key is configured to evade the jammer via at least one of:
adjusting at least one directionality of the plurality of MIMO antenna elements;
and
adjusting at least one beam emitted by the plurality of MIMO antenna elements.

7. The MU MIMO module of claim 5, wherein:
the Tx 5G communications platform and the Rx 5G communications platform correspond to at least one first transmitter-receiver (Tx-Rx) pair, and the receiver feedback is first receiver feedback;
the control processor is configured to forward the receiver feedback to at least one arbitrator of the peer-to-peer network environment, the arbitrator in communication with one or more second Tx-Rx pairs associated with the peer-to-peer network environment, the one or more second Tx-Rx pairs associated with second receiver feedback;
and
the control processor is configured to receive at least one of the detected presence and the detected location from the arbitrator, the detected presence and the detected location based on at least one of the first receiver feedback and the second receiver feedback.

8. The MU MIMO module of claim 7, wherein the arbitrator includes at least one of:
a centralized spectrum arbitrator;
and
a 5G communications platform of the one or more second Tx-Rx pairs.

9. A method for enhancing transmission security (TRANSEC) within a fifth-generation (5G) peer-to-peer network environment, the method comprising:
transmitting, via a plurality of multiple-input multiple-output (MIMO) antenna elements of a transmitting (Tx) 5G radio system, a current frame to a receiving (Rx) 5G radio system according to at least one current compound TRANSEC encryption key;
receiving, from the Rx 5G radio system, receiver feedback corresponding to the transmitting of the current frame;
generating, via a multi-user (MU) MIMO module of the Tx 5G radio system, at least one subsequent compound TRANSEC encryption key based on the receiver feedback, the subsequent compound TRANSEC encryption key configured to encrypt the transmission of a subsequent frame immediately following the current frame via at least two of:
dynamic distribution of transmission power among the plurality of MIMO antenna elements;
selection of one or more spectrum resources blocks associated with the transmission of the subsequent frame based on at least one frequency hopping code;
and
selection of the one or more spectrum resources blocks based on at least one orthogonality hopping code;
and
adjusting, via an antenna controller of the Tx 5G radio system, the dynamic distribution of transmitting power to the plurality of MIMO antenna elements based on the subsequent compound TRANSEC encryption key.

10. The method of claim 9, wherein:
transmitting, via a plurality of multiple-input multiple-output (MIMO) antenna elements of a Tx 5G radio system, a current frame to a Rx 5G radio system includes transmitting a plurality of training symbols to the Rx 5G radio system;
and
receiving, from the Rx 5G radio system, receiver feedback corresponding to the transmitting of the current frame includes receiving, from the Rx 5G radio system, receiver feedback based on the plurality of training symbols.

11. The method of claim 9, wherein receiving, from the Rx 5G radio system, receiver feedback corresponding to the transmitting of the current frame includes at least one of:
receiving, from the Rx 5G radio system, at least one identification of a least faded path from at least one antenna element of the plurality of MIMO antenna elements to at least one remote MIMO antenna element of the Rx 5G radio system;
and
receiving, from the Rx 5G radio system, at least one identification of an optimally performing element of the plurality of MIMO antenna elements.

12. The method of claim 9, wherein the Tx 5G radio system and the Rx 5G radio system comprise a first transmitter-receiver (Tx-Rx) pair of the peer-to-peer network environment and the receiver feedback is first receiver feedback, further comprising:
forwarding, via the MU MIMO module, the receiver feedback to at least one arbitrator of the peer-to-peer network environment, the arbitrator in communication with at least one second Tx-Rx pair of the peer-to-peer network environment, the second Tx-Rx pair associated with second receiver feedback;
and
receiving, via the MU MIMO module, at least one indication of a jammer from the arbitrator, the indication based on one or more of the first receiver feedback and the second receiver feedback.

13. The method of claim 12, wherein adjusting, via an antenna controller of the Tx 5G radio system, the dynamic distribution of transmitting power to the plurality of MIMO antenna elements based on the subsequent compound TRANSEC key includes at least one of:
adjusting at least one directionality of an antenna element of the plurality of MIMO antenna elements based on the indication;
and
adjusting at least one beam emitted by an antenna element of the plurality of MIMO antenna elements based on the indication.

14. The method of claim 9, wherein adjusting, via an antenna controller of the Tx 5G radio system, the dynamic distribution of transmitting power to the plurality of MIMO antenna elements based on the subsequent compound TRANSEC key includes:
adjusting, via an antenna controller of the Tx 5G radio system, the dynamic distribution of transmitting power to prevent a null power distribution to any antenna element of the plurality of MIMO antenna elements based on the subsequent compound TRANSEC key.

* * * * *